April 16, 1968
R. A. HANSON
3,377,726
CANAL TRIMMER
Filed May 24, 1965
6 Sheets-Sheet 1
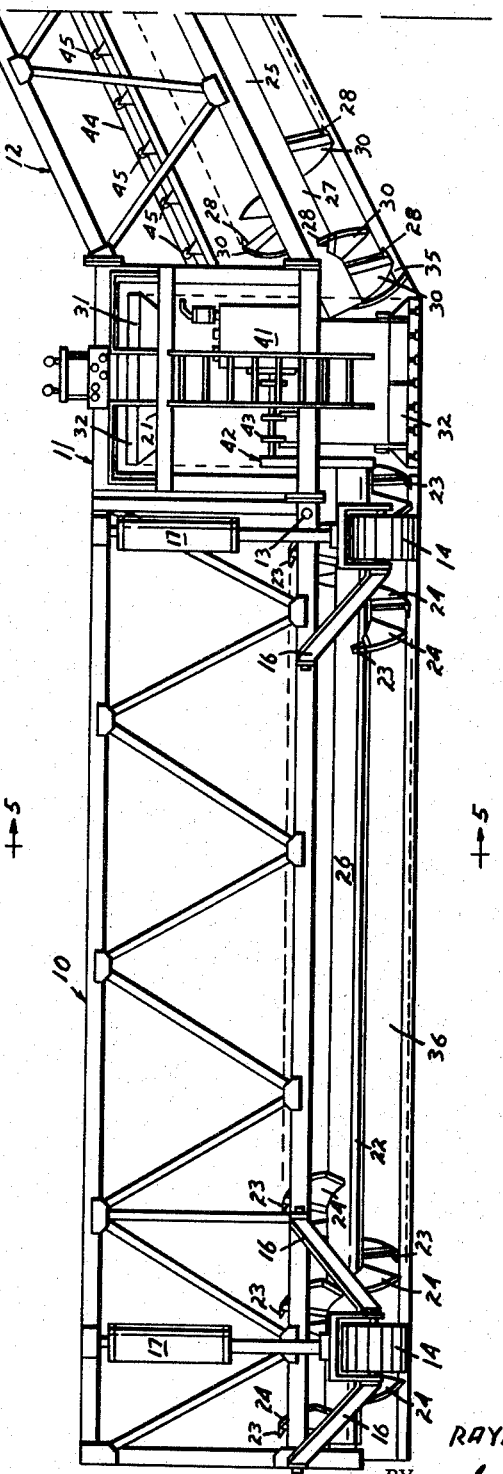
INVENTOR.
RAYMOND A. HANSON
BY
ATTYS.

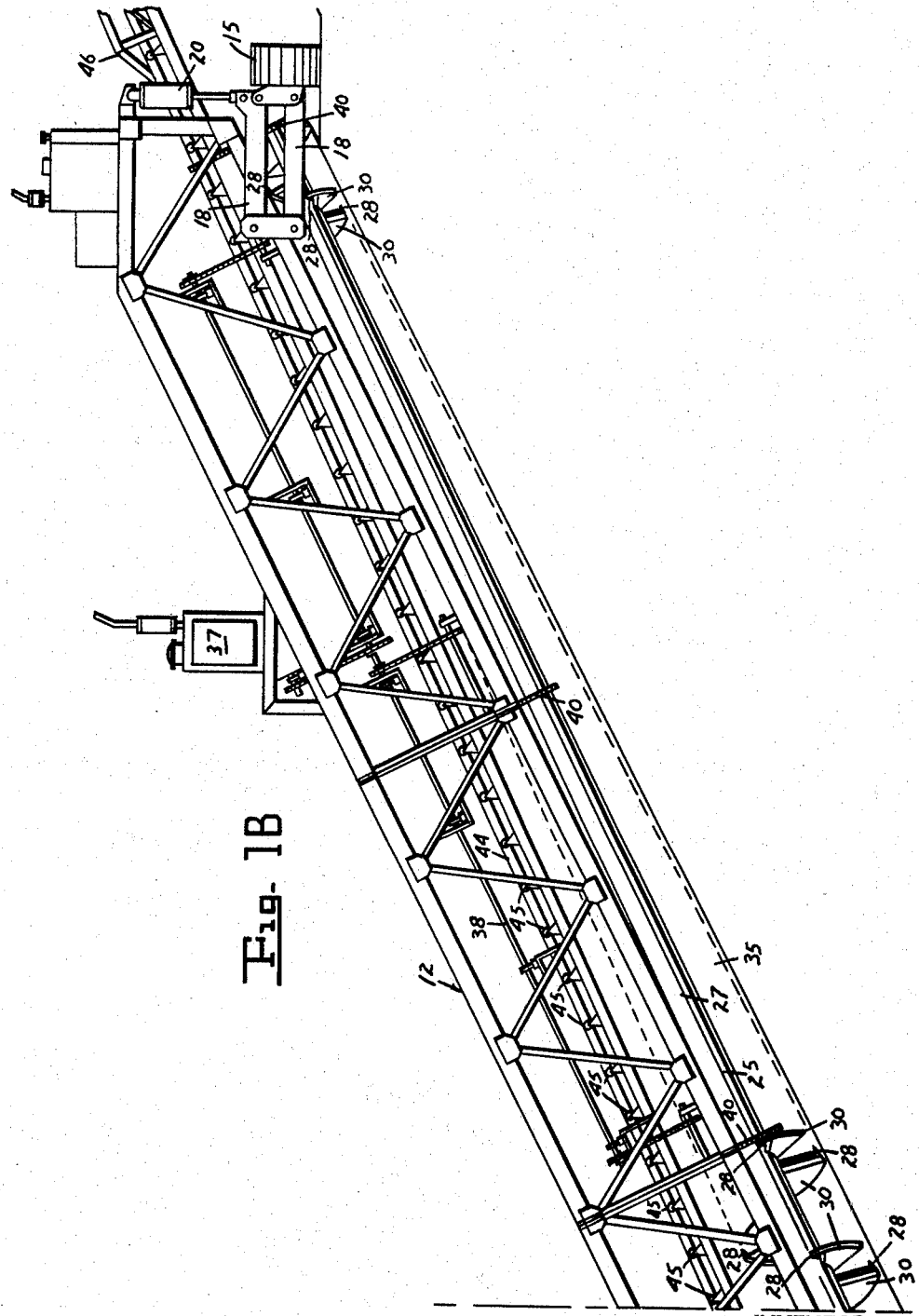

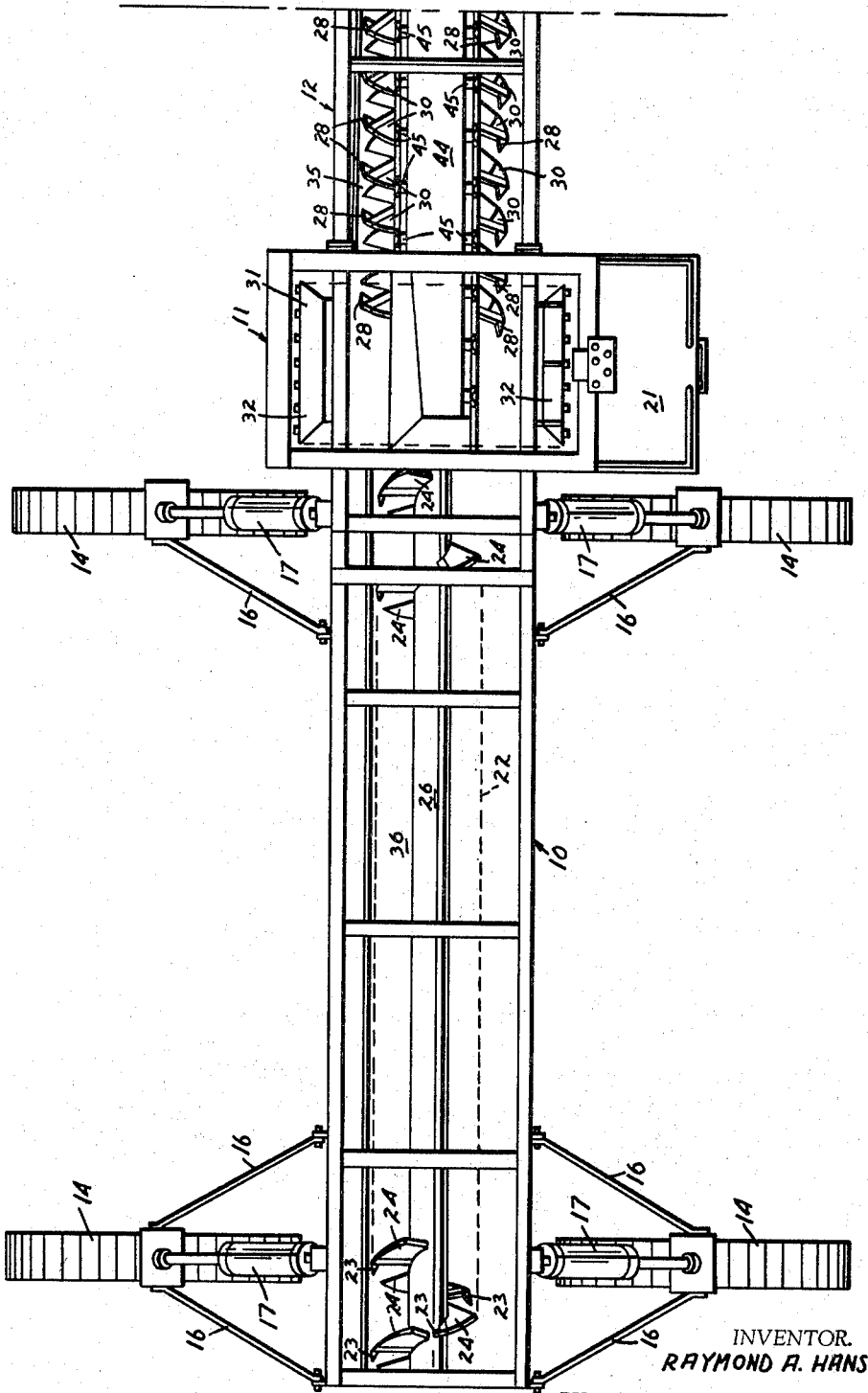

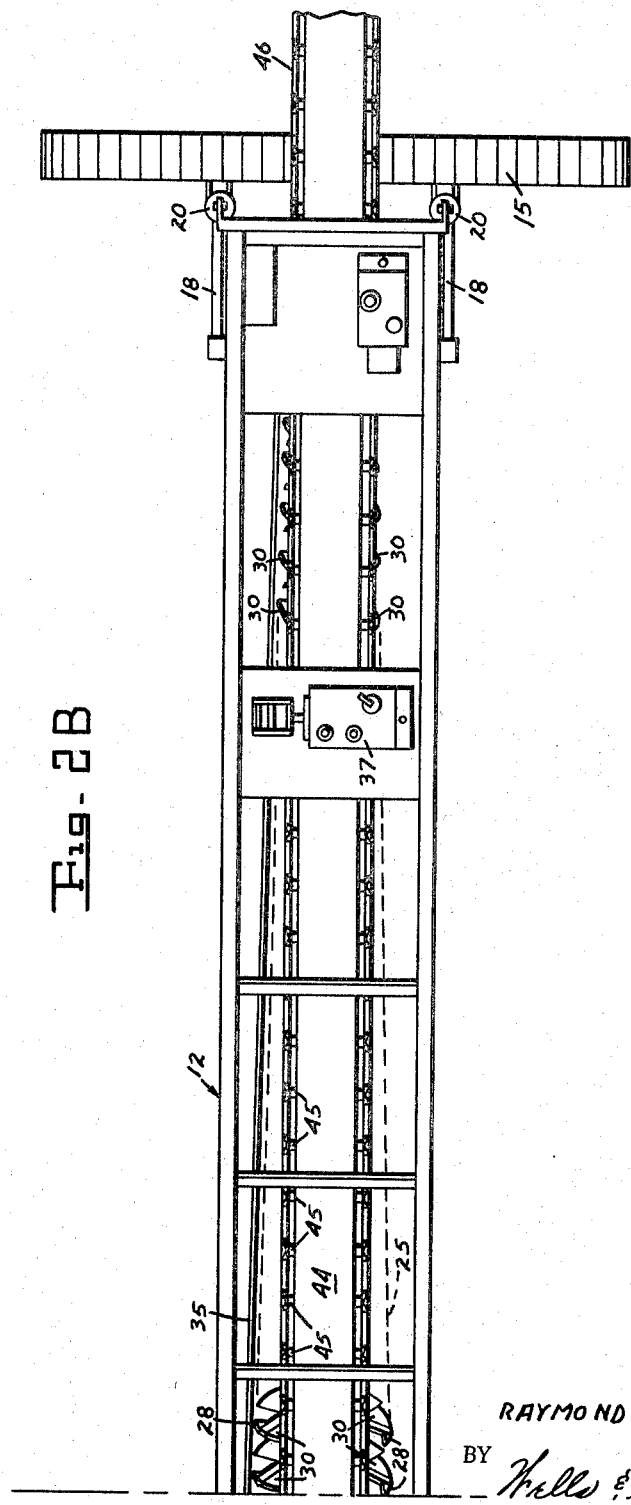

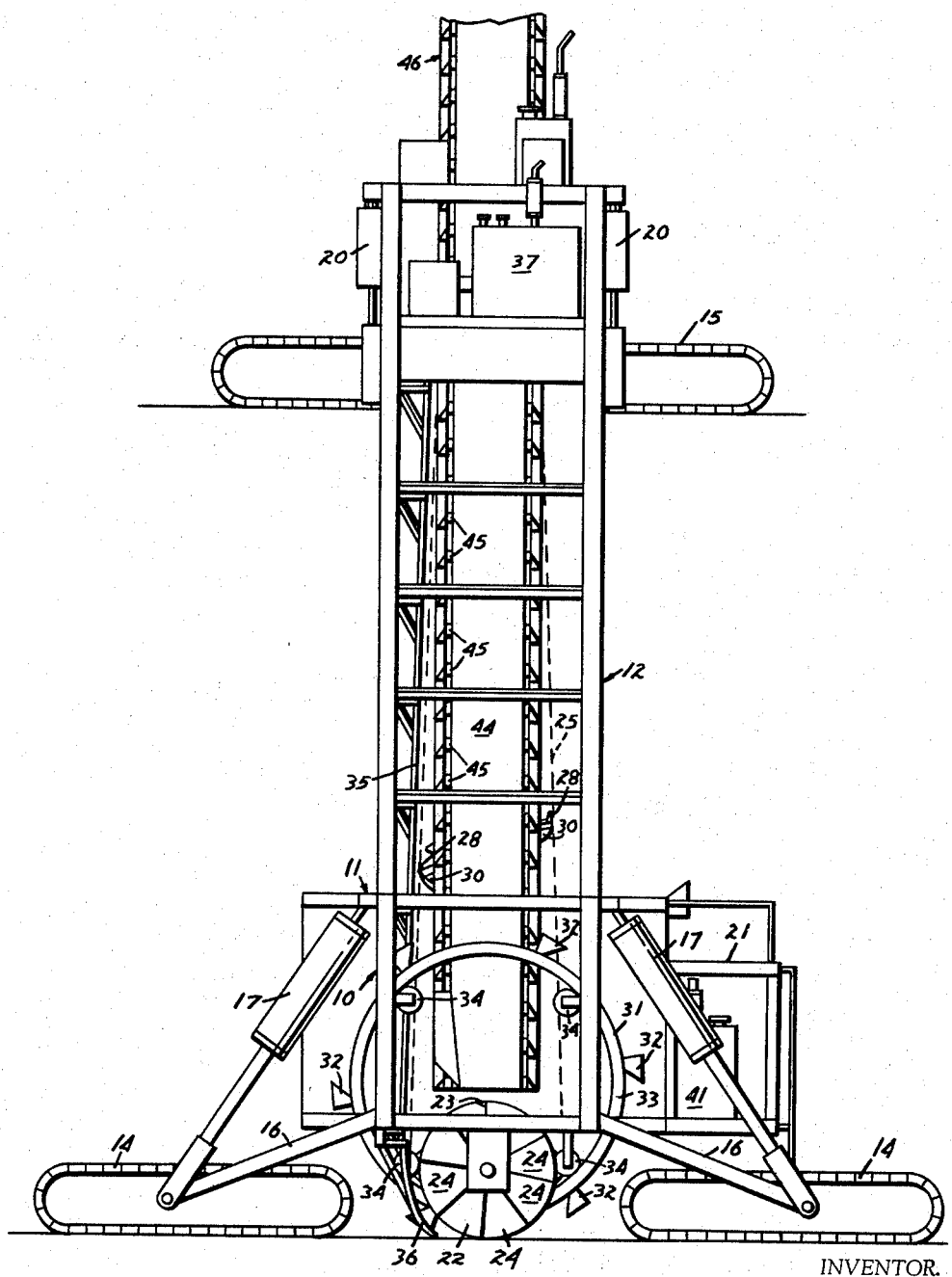

April 16, 1968
R. A. HANSON
CANAL TRIMMER
3,377,726
Filed May 24, 1965
6 Sheets-Sheet 6
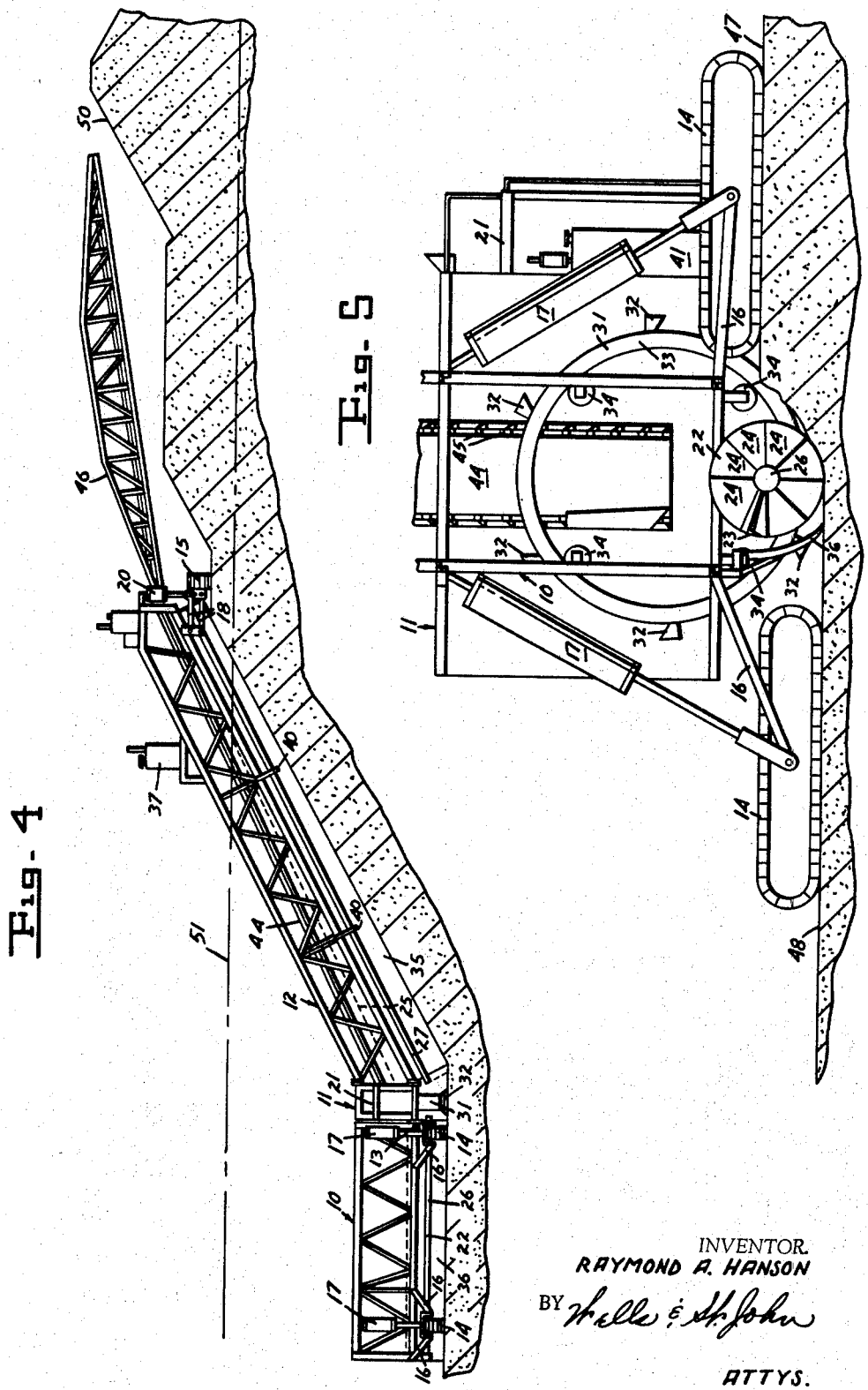
INVENTOR.
RAYMOND A. HANSON
BY *Wells & St. John*
ATTYS.

United States Patent Office 3,377,726
Patented Apr. 16, 1968

3,377,726
CANAL TRIMMER
Raymond A. Hanson, c/o R. A. Hanson Company,
Palouse, Wash. 99161
Filed May 24, 1965, Ser. No. 457,988
4 Claims. (Cl. 37—82)

ABSTRACT OF THE DISCLOSURE

A canal trimmmer comprising a horizontal bottom frame, a slope frame and an intermediate digging wheel frame. The outer ends of the three connected frame sections are supported by powered tracks that are vertically adjustable. A horizontal and slope plane sections are each provided with digging and trimming augers which carry excess soil to the digging wheel frame, which is provided with an upright digging wheel. A wheel lifts the soil carried to it and drops it upon a powered discharge conveyor which carries the soil to the side of the excavation.

---

This invention relates to a novel apparatus for trimming soil along the sloped sides and horizontal bottom surfaces of a canal having a wide trapezoidal shaped cross section.

The trimming of large canals has, in recent years, been complicated by the sheer size of the canal cross section and the length of canal projects being built or presently contemplated. The relocation and conservation of water as a resource makes efficient completion of such canals imperative. To assist in such production, automated machinery has been developed to dig and trim the canal and to line the canal surfaces with concrete or other material. The present invention is concerned with a trimming apparatus for smoothing the earth surfaces of a canal along both the sloped sides and the horizontal bottom. The machine is adjustable and is capable of handling a high capacity of earth during a trimming operation, so that the area being lined can be finished in one pass of the machine.

It is a first object of this invention to combine a trimming auger along the slope of a canal cross section with another auger along the bottom of the canal cross section, both augers being used to direct earth toward a digging wheel located at the junction of the two trimmed surfaces so that excess material is passed along the maximum practical surface to fill any voids or low spots that might be encountered along the length of the canal.

Another object of this invention is to relate digging augers for both the sloped and horizontal canal surfaces so as to utilize a single elevating digger wheel and conveyor to handle all of the removed material from the entire trimmed surface during a single pass of the canal trimmer.

Another object of this invention is to provide such an apparatus that can be mounted independently on tracks and self propelled, so as to be adaptable to automated controls to assure proper trimming accuracy.

These and further objects will be evident from the following disclosure, taken together with the accompanying drawings, which illustrate a preferred form of the invention. The illustrated structure is merely exemplary and is shown without mechanical details that would be obviously available to one skilled in this field.

In the drawings:

FIGURE 1 is an elevation view taken perpendicular to the length of a canal, showing the canal trimmer;

FIGURE 1A is a section of the elevation view showing the horizontal trimming arrangement and the lower portion of the slope trimmer;

FIGURE 1B is a continuation of FIGURE 1A showing the remainder of the apparatus for trimming the slope surfaces, the extended portions of the discharge conveyor being broken away;

FIGURE 2 is a top view of the apparatus shown in FIGURE 1, with FIGURES 2A and 2B corresponding to FIGURES 1A and 1B respectively;

FIGURE 3 is an end view of the apparatus as seen from the left of FIGURE 1;

FIGURE 4 is a simplified cross sectional view looking down the length of a canal showing the entire trimming apparatus and its relation to the various soil surface configurations; and FIGURE 5 is a fragmentary sectional view taken along line 5—5 in FIGURE 1A.

Referring now to the drawings, the general features of a machine embodying this invention are illustrated in detail in FIGURES 1 through 3 and 5, FIGURE 4 being a schematic represenation of the entire assembly. As shown in the drawings, the supporting framework for the apparatus is actually composed of three sections, a bottom horizontal frame 10, a digging wheel frame 11 and a slope frame 12. The digging wheel frame 11 is fixed to the lower end of the slope frame 12, while the horizontal frame 10 is pivotally connected to the digging wheel frame 11 by shafts 13. The purpose of the hinge provided by shafts 13 between the horizontal frame 10 and the digging wheel frame 11 is to permit minor variations in the angular relationship between the two rigid frame sections so as to accommodate mechanical adjustment of the apparatus for proper grade control without producing unnecessary strain on the frame members.

The horizontal frame 10 is supported by two sets of paired track units 14, each individual track unit being self propelled. The track units 14 are carried on the frame 10 by outwardly protruding pivoted arms 16, the height of each track unit 14 being adjustable by means of pivoted cylinder assemblies 17. As shown in FIGURE 5, the forward track unit 14 of each pair of units will ride on the higher surface prepared prior to trimming, while the rear track unit 14 will ride on the finished or trimmed surface. For this reason, each track unit 14 is independently mounted on the frame 10 by the arms 16.

The upper end of the slope frame 12 is supported by a long track unit 15 carried by parallelogram arms 18 pivoted to both the track unit 15 and slope frame 12. The elevation of track unit 15 relative to the slope frame 12 is adjustable by means of cylinder assemblies 20.

The entire mechanism is operated as a unit, the various mechanical portions being controlled by automatic or manual controls not the subject matter of this application. The person running the machine is situated on an operator's platform 21 located at the top of the digging wheel frame 11, from which he can view the operation of the mechanism to either side of him.

Mounted beneath the horizontal frame 10 is a horizontal trimming and digging auger 22 carried on a shaft 26 parallel to the ground surface along the bottom of the canal. Located behind auger 22 is a fixed finishing blade 36. Auger 22 is comprised of a series of spiral blades 24 which are segmented and which have leading edges provided with protruding digging teeth 23. The teeth 23 dig into the soil to the desired depth and the segmented spiral blades 24 move soil loosened by the teeth 23 toward the digging wheel frame 11 during rotation of the shaft 26.

Mounted along the lower portion of the slope frame 12 is a similar slope auger 25 and finishing blade 35. Auger 25 is mounted on a shaft 27 and also comprises segmented spiral blades 30 and digging teeth 28. The rotation of shaft 27 is such that loosened soil is moved downwardly to the digging wheel frame 11. It is to be noted that the diameter of the horizontal auger 22 is shown uniform along its length, while the diameter of the slope auger 25 is reduced along its length, diminishing toward the upper end thereof. Since the upper end of the slope auger 25 engages a substantially lessened amount of soil, the additional bulk required to utilize a larger auger of constant diameter is not required in this particular application.

A digging wheel unit 31 is rotatably mounted in the digging wheel frame 11. It comprises a number of peripheral buckets 32 carried by side support rings 33, the rings 33 being journalled in the frame 11 by support wheels 34. The buckets 32 serve to trim the corner portion of the bottom horizontal section of a canal and also serve to lift soil moved to them by action of the auger units 22 and 25.

The various mechanical components are powered by engines located on both the slope and horizontal sections of the machine. A first motor 37 is generally shown on the slope frame 12 (FIGURE 1B) and drives a shaft 38 running along a portion of the length of the frame 12. Shaft 38 powers sprockets 40 on the auger shaft 27 to properly rotate the auger 25.

A second motor 41 is shown on the digging wheel frame 11, this motor 41 serving to power a drive train 42 to the shaft 26 for the horizontal digging auger 22 and also to power sprockets 43 to turn the support rings 33 on the digging wheel unit 31. The flexibility necessary to accommodate limited pivotal movement between frame 10 and 11 is accomplished by use of suitable sprocket and chain connections.

A conventionally powered discharge conveyor 44 is provided for material elevated by the buckets 32 of the digging wheel 31. The conveyor 44 is carried in the slope frame 12 by means of support rollers 45 that support the upper flight of conveyor 44. The conveyor 44 may discharge at any desired location at the top of the machine. As seen in FIGURE 4, an extension frame 46 may be utilized to extend the discharge end of conveyor 44 outwardly beyond the trimming unit so as to dump excess soil at a remote location such as shown at 50.

The machine illustrated has been used to trim a canal in two passes, the cross sectional area of the canal being too great for a conventional trapezoidal device. The machine, during each pass along the length of a canal, trims the entire slope at one side of the canal and half of the bottom canal section. Soil moved by augers 22, 25 covers a wide swath to fill any low areas. All of the soil loosened by the augers 22, 25 and by the digging wheel 31 is discharged onto the conveyor 44 by operation of the digging wheel 31. Furthermore, the nature of the digging wheel 31 insures a well defined corner at the junction between the two augers 22 and 25. As shown in FIGURE 5, a typical pass of the machine might remove several inches of soil between the initial grade 47 prior to trimming and the final desired grade 48. The elevation of the various units can be automatically controlled by adjustment of the various cylinder assemblies 17 and 20.

The basic concept in this invention is the combination of the two augers 22, 25 with the digging wheel assembly 31 so as to use the extended width possible in an auger type of trimmer while also utilizing the high capacity lifting capability of a digging wheel assembly. Modifications could obviously be made in the supporting framework and in the peculiar type of auger structure used, as well as in the digging wheel structure. However, the relationship that exists between the operating augers and the digging wheel, together with the discharging conveyor 44 is of prime importance in the trimming of a canal to the cross sectional configuration shown in FIGURE 4, wherein line 51 illustrates the original grade along the canal section prior to any trimming operation. It is to be understood that the opposite side of the canal will constitute a mirror image of that shown in FIGURE 4, the machine being run down the opposite side in an opposite direction.

Having thus described my invention, I claim:

1. In an apparatus for longitudinally trimming a transversely sloped soil surface:
   a mobile supporting framework supported for motion longitudinally along the surface, a portion of said framework extending transversely across the width of the surface;
   digging auger means rotatably journalled on said framework across the width of said portion thereof parallel to the desired sloped surface configuration;
   means on said framework operatively connected to said digging auger means to rotate said digging auger means so as to move material engaged thereby toward the lower end of the digging auger means;
   and powered digging wheel means rotatably mounted on said framework in communication with the lower end of said digging auger means to trim the soil surface beneath said digging wheel means and receive material directed thereto by operation of said digging auger means;
   second digging auger means rotatably journalled on said framework at the side of said digging wheel means opposite to said first-named digging auger means, the axis of said second digging auger means on said framework being parallel to the rotational axis of said digging wheel means on said framework, the elevation of said second digging auger means being such in relation to the elevation of said digging wheel means that the lower digging surfaces thereof are coplanar in a plane angularly intersecting a plane containing the lower digging surfaces of said first-named digging auger means;
   and means on said framework operatively connected to said second digging auger means to rotate said digging auger means so as to move material engaged thereby to said digging wheel means.

2. An apparatus as defined in claim 1 further comprising:
   conveyor means on said framework extending from said digging wheel means to one side of said framework to carry material removed by said digging wheel and deposited thereon.

3. In an apparatus for longitudinally trimming a transversely sloping soil surface and an intersecting lower horizontal soil surface;
   a mobile supporting framework;
   an auger rotatably mounted on said framework having a rotational axis oriented perpendicularly to the intended direction of travel of said framework and parallel to the desired slope surface;
   an open digging wheel rotatably mounted on said framework at the lower end of said auger for rotation about an axis perpendicular to the intended direction of movement of said framework, the outer peripheral edges of said wheel being complementary to the desired soil configuration of the lower horizontal soil surface adjacent to the sloping surface;
   a second auger rotatably mounted in said framework at the side of said digging wheel opposite to said first named auger, the rotational axis of said second auger being parallel to that of said digging wheel;

power means on said framework operatively connected to said augers to rotate the respective augers in directions such as to move material engaged thereby in a direction toward the digging wheel;

and means on said framework operatively connected to said digging wheel to rotate said digging wheel about its rotational axis on said framework.

4. An apparatus as set out in claim 3, further comprising:

conveyor means on said framework for receiving material from said digging wheel, said conveyor means being mounted on said framework to receive material discharged by said digging wheel and said conveyor means being directed outwardly from said digging wheel beyond said first-named auger.

References Cited

UNITED STATES PATENTS

| 1,846,549 | 2/1932 | Geiger | 37—191 |
| 2,867,046 | 1/1959 | Baer | 37—192 |
| 3,247,922 | 4/1966 | Hanson | 61—63 |

FOREIGN PATENTS

| 599,037 | 11/1925 | France. |
| 154,185 | 1963 | U.S.S.R. |

ANTONIO F. GUIDA, *Primary Examiner.*

ABRAHAM G. STONE, *Examiner.*

A. KOPECKI, R. HOLLISTER, *Assistant Examiners.*